Patented July 7, 1931

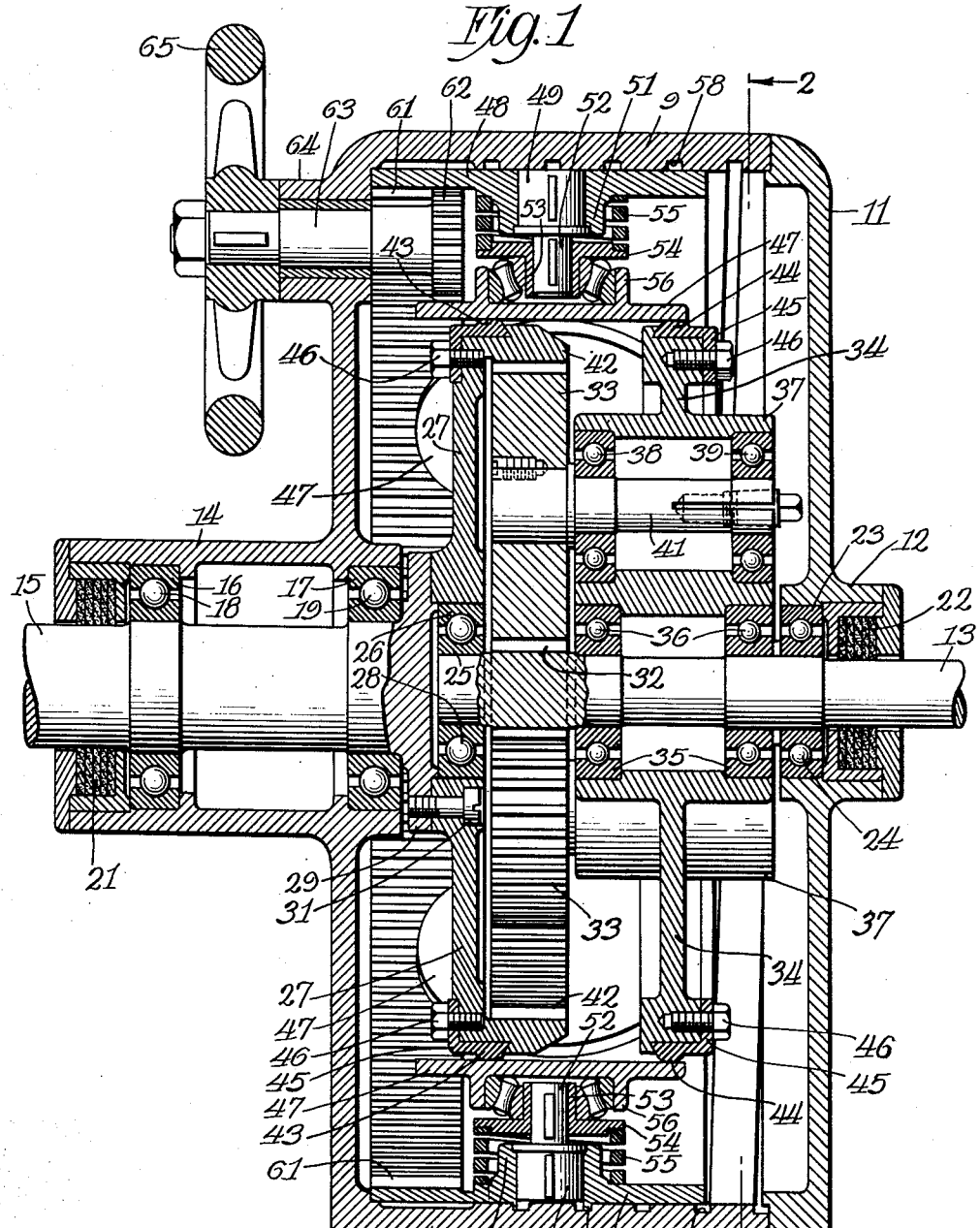

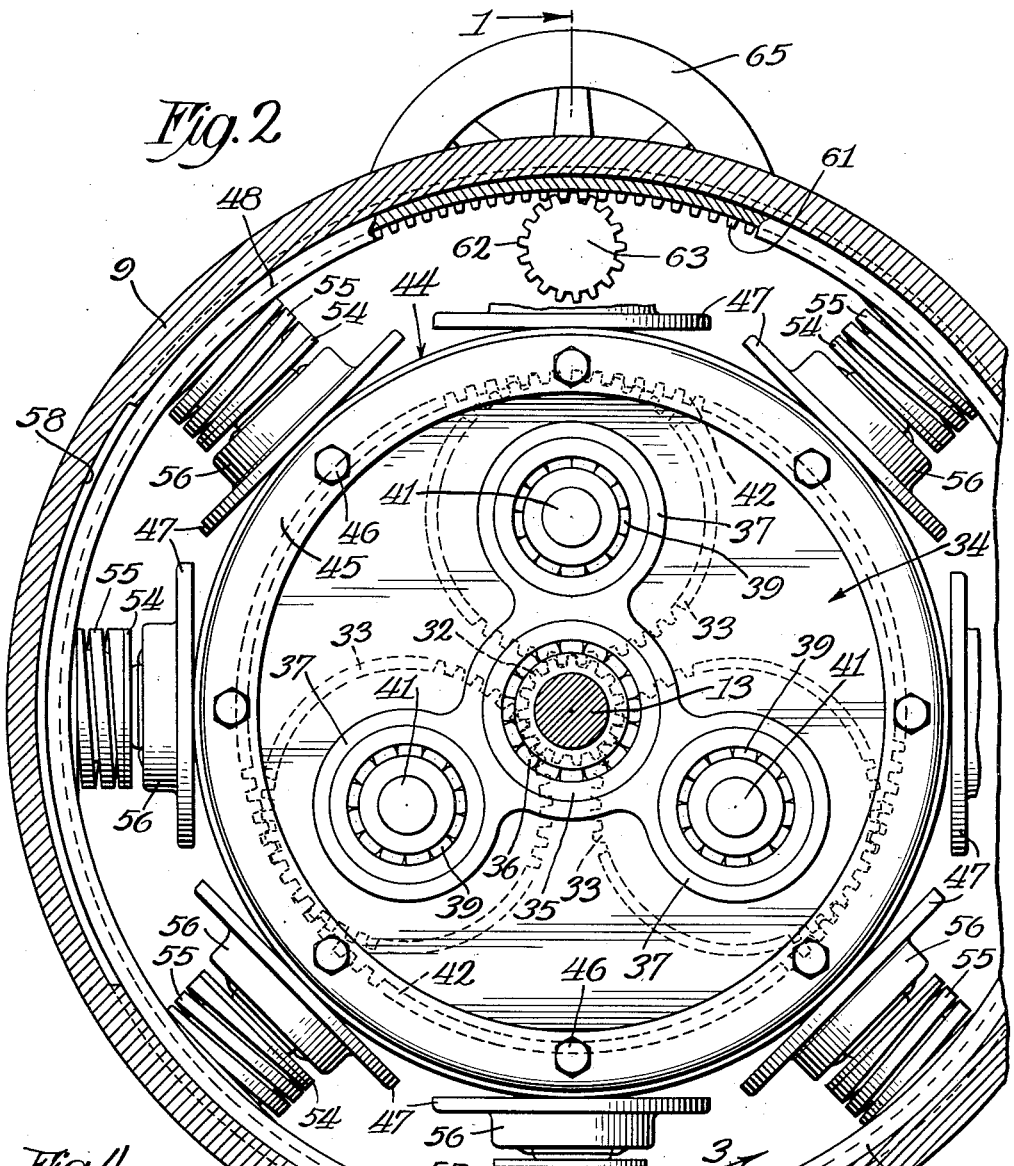
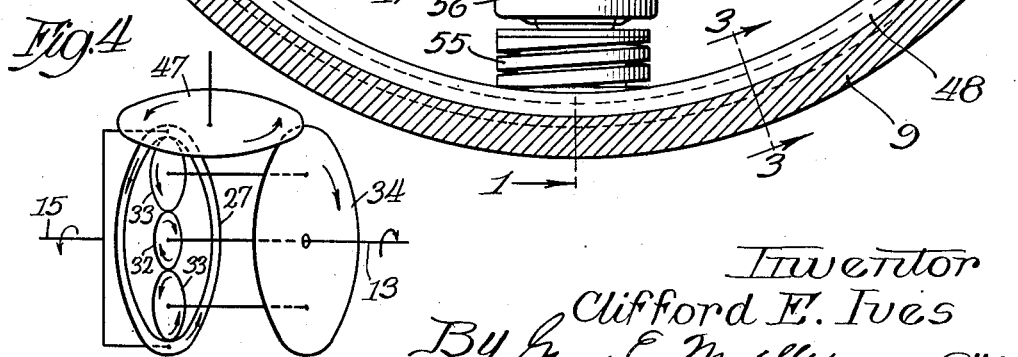

1,812,877

UNITED STATES PATENT OFFICE

CLIFFORD E. IVES, OF WILMETTE, ILLINOIS

VARIABLE SPEED DEVICE

Application filed April 12, 1930. Serial No. 443,680.

My invention relates to a variable speed mechanism and more particularly to a variable speed reducing mechanism for driving slow speed machinery and the like from a high speed source of power.

A variable speed unit in which the speed is varied wholly by means of gears is limited in its application because the speed can be varied only in steps corresponding to the gears provided. On the other hand, in a variable speed unit in which friction drives are used for effecting the entire speed variation and transmitting the entire load a considerable waste of energy takes place.

In accordance with the general features of my invention I provide a variable speed unit in which one component of the force between the driving and driven members is transmitted through a gear train, and another component of this force is transmitted through a friction device, thereby eliminating a substantial portion of the friction usually encountered in such devices due to the provision of a gear connection for a portion of the load.

An object of the invention is to provide a new and improved variable speed device.

A further object is to provide a unit in which the speed is continuously variable through a wide range.

A further object is to provide a continuously variable speed unit in which a portion of the load is transmitted through a direct gear connection.

A further object is to provide a continuously variable speed unit in which only a portion of the load is transmitted through a friction drive.

A further object is to provide a variable speed unit having a considerable reducing ratio at all speeds, making it unnecessary to use a separate reducing mechanism with the variable speed drive to obtain low speeds.

Other objects and advantages will appear as the description proceeds.

Referring to the drawings,

Fig. 1 is a sectional view of the apparatus embodying my invention, taken on line 1—1 of Fig. 2, Fig. 2 is a sectional view of the apparatus taken on line 2—2 of Fig. 1, Fig. 3 is a detail sectional view taken on line 3—3 of Fig. 2, and, Fig. 4 is a diagrammatic view illustrating the principle of operation of the apparatus.

The speed reducing mechanism is enclosed in a housing 9, having a removable end plate 11. Concentrically supported in one end of the housing is a journal box 12 for the driving shaft 13, and in the opposite end is a journal box 14 for the driven shaft 15. Journal box 14 is provided with ball races 16 and 17 which cooperate with ball bearings 18 and 19, forming a two-bearing support for the driven shaft. The end of journal box 14 is designed to support packing material 21 to prevent the escape of oil from the housing. Journal box 12 is similarly designed to support packing material 22, to prevent the leakage of oil from the housing. This journal box is provided with only one ball race 23 and ball bearings 24. The end of shaft 13 carries a collar 25 which forms a ball race, and a complementary ball race 26 is carried by a disc 27. The ball races 25 and 26 together with ball bearings 28 thus constitute a journal for the end of the shaft. Disc 27 is attached to a flange 29, of the driven shaft by means of a plurality of bolts 31. It will thus be seen that both the driving shaft and the driven shaft are provided with a two-point bearing support, the shafts being concentric and lying along the same axis.

Shaft 13 carries a sun gear 32 which meshes with three planet gears 33 arranged to revolve about gear 32. A disc 34 is arranged to freely rotate about shaft 13 on ball bearings 35 and 36. The disc is provided with three journals 37, each of which has ball bearings 38 and 39, in which a shaft 41 of the planet gears is journaled. The planet gears mesh with an internal or orbit gear 42 supported by disc 27. The discs 27 and 34 are of the same diameter and are provided with friction bands 43 and 44 around their outer periphery. These friction bands have a portion 45 extending over the face of the disc where they are secured to the disc by bolts 46. The gear ratio of gears 32 and 33 is 1 to 3. In other words, gears 33 have three times the number of teeth as gear 32. The gear ratio between gears 32 and 43 is 1 to 7, that is, the gear 42 has seven times the number of teeth as gear 32. From this it is evident that if disc 34 is held stationary while shaft 13 is rotated, it will require seven rotations of shaft 13 for one rotation of disc 27. If the disc 27 is held stationary, it will require eight revolutions of shaft 13 for one revolution of disc 34, the additional rotation being due to one revolution of the planet gears about their orbit. If therefore, the peripheral speeds of disc 27 and disc 34 are equal and in opposite directions, it will require fifteen rotations of shaft 13 for one rotation of shaft 15, shaft 15 being directly connected to disc 27.

In order to govern the relative speeds of disc 27 and disc 34, a plurality of discs 47 are mounted in an annular support 48, with their axis perpendicular to the axis of the driving and driven shafts. The annular support 48, has a plurality of stud shafts 49 which are supported in bosses 51 arranged upon the inner periphery of the annular support. Each shaft 49 has a reduced end 52 upon which a collar 53 is slidably mounted. This collar has a disc 54 integral with its lower end and resting upon a heavy spring 55 which exerts an inward pressure on the disc 54. Discs 47 have a collar 56 and a thrust bearing is interposed between collar 53 and collar 56. Thus the discs 47 are continuously forced into frictional engagement with friction bearings 43 and 44 on the peripheries of discs 27 and 34 respectively. In the position shown in Fig. 1, friction bearing 43 is one-half the distance from the center of rotation of disc 47 as compared to friction bearing 44. When in this position disc 34 will rotate at twice the speed as disc 27. In order to determine the ratio of speed between shafts 13 and 15 it is only necessary to remember that one rotation of shaft 15 through the gears requires seven rotations of the drive shaft. Since disc 34 must make two revolutions while disc 27 makes one revolution, and it requiring eight revolutions of shaft 13 for one revolution of shaft 34, shaft 13 must make seven, plus eight, plus eight, or twenty-three revolutions for one revolution of shaft 15. That is, the speed reduction is 23 to 1. If disc 47 were shifted to the right so that friction bearing 43 would be the same distance from the center of rotation of disc 47 as disc 44, the disc 27 and disc 34 would rotate at the same speed and provide a speed reducing ratio of 15 to 1 as pointed out above. When disc 47 is shifted still further to the right so that friction bearing 43 will be twice the distance from the center of rotation of disc 47 as friction bearing 44, disc 34 will travel at one-half the peripheral speed as disc 27, providing a speed reducing ratio of 11 to 1. Any intermediate speed reduction may be obtained depending upon the position of disc 47.

I will now describe the means for shifting the annular support 48 which carries the discs 47. The external periphery of the annular support 48 is provided with spiral threads 57 which engage spiral grooves 58 in the housing. The end of the annular support is provided with internal teeth 61 which mesh with a gear 62. This gear is mounted on a shaft 63 extending from the housing through a boss 64 and provided with a hand wheel 65 for the purpose of rotating the gear. Upon turning the hand wheel gear 62 will cause a rotation of support 48 and due to the threads 57 and grooves 58 the support will be shifted either to the right or left as viewed in Fig. 1, depending upon the direction of rotation of hand wheel 65.

One of the outstanding advantages of my invention arises from the fact that only one component of the load transmitted by the apparatus is transmitted through the friction drive. Assuming, for example, that the apparatus is set to provide a 15 to 1 reduction of speed, seven revolutions of the fifteen will be effective to transmit energy through the gearing, while the remaining eight will be effective to transmit energy through the friction drive. In other words, 7/15 of the energy transmitted through the mechanism at this particular ratio, is transmitted through gearing. On the other hand, when a 23 to 1 reduction of speed is employed, 7/23 of the energy is transmitted through the gearing and 16/23 through the friction drive.

This apparatus differs from many of the planetary speed reducing mechanisms in that an extremely small amount of energy is wasted by friction. The retarding effort exerted upon the disc 34 in the apparatus disclosed, instead of being wasted, is transmitted to the driven disc 27 through discs 47.

In calculating the amount of energy transmitted through the gearing and through the friction drive, the amount of work done by discs 27 and 34 is based upon the number of rotations of the drive shaft required to produce one rotation of the discs. When the apparatus is used for driving a machine, as for instance, a sewing machine, the torque applied to the driving shaft of the sewing machine is substantially constant at all speeds. However, the power consumed by the machine will vary with the speed of the machine, increasing for high speeds and decreasing for low speeds. Thus, at high speeds when a large amount of power is consumed, a larger amount of the power is transmitted through the gearing, and at slow speeds when a smaller amount of power is consumed, a proportionately larger amount of the power is transmitted through the friction drive.

Considering Fig. 2 of the drawings, it will be seen that the radially inward pressure on the discs 27 and 34 is balanced. That is, for each disc 47 pressing against one side of one of these discs, there is another disc 47 exerting an equal pressure at a point diametrically opposite so that the pressures on the discs are not transmitted to the driving and driven shaft bearings. This removes substantially all of the load from the bearings of driving shaft 13 and driven shaft 15.

While I have described and illustrated a specific form of the invention, I do not limit myself to the details disclosed, since it will be understood that many modifications may be made in the embodiment of the invention disclosed without departing from the spirit and scope of the invention.

What I claim as new and desire to protect by Letters Patent of the United States is:

1. A variable speed device comprising a sun gear, an orbit gear, a planet gear interconnecting said gears, a rotatable member concentric with the sun gear carrying said planet gear, and a second rotatable member contacting with and interconnecting the orbit gear and the rotatable member to effect an exchange of forces therebetween.

2. A variable speed device comprising a sun gear, orbit gear, a planet gear interconnecting said gears, a rotatable disc revolvably supporting the planet gear, said disc and orbit gear having substantially the same diameter, and a rotatable disc frictionally engaging the peripheries of said first disc and the orbit gear.

3. A variable speed device comprising a sun gear, orbit gear, a planet gear interconnecting the sun and orbit gear, a rotatable member supporting the planet gear, a disc engaging the peripheries of the orbit gear and the rotatable member, and means for resiliently urging said disc to exert a pressure against said peripheries to provide a driving connection between the rotatable member and orbit gear.

4. A variable speed device comprising a driving shaft, a driven shaft in axial alignment therewith, a driving gear mounted on the driving shaft, a driven gear mounted on the driven shaft, a disc rotatably mounted on the driving shaft, a planet gear rotatably mounted on said disc and revoluble about the driving shaft, said planet gear interconnecting the driving and driven gears, a disc having its axis perpendicular to the driving and driven shafts and engaging the peripheries of the first disc and the driven gear forming a driving connection therebetween.

5. A variable speed device comprising a driving shaft, a driven shaft in axial alignment therewith, a driving gear mounted on the driving shaft, a driven gear mounted on the driven shaft, a disc rotatably mounted on the driving shaft, a planet gear rotatably mounted on said disc and revoluble about the driving shaft, said planet gear interconnecting the driving and driven gears, a disc having its axis perpendicular to the driving and driven shafts and engaging the peripheries of the first disc and the driven gear forming a driving connection therebetween, and means for shifting said second disc longitudinally with respect to the axes of the driving shafts to vary the speed of the driven gear.

6. A variable speed device comprising a driving gear, a driven gear, a planet gear interconnecting said gears, a rotatable member supporting the planet gear, a plurality of discs engaging the peripheries of the rotatable member and the driven gear, an annular member supporting said discs, resilient means for engaging the discs with said peripheries, a frame for supporting said annular member, and means for shifting said annular member longitudinally of the frame to vary the speed between the driving and driven gears.

7. A variable speed device comprising a pair of rotatable members having a point of their peripheries in a plane, a rotatable disc engaging said points, an annular member carrying said disc, said member being provided with threads, a frame having cooperating threads and means for rotating said annular member to laterally shift the disc to cause a variation in the speed ratio of the rotatable members.

8. A variable speed device comprising a sun gear, an orbit gear, a planet gear interconnecting the sun and orbit gears, a rotatable member supporting the planet gear, and a disc engaging the peripheries of the orbit gear and the rotatable member.

9. A variable speed device comprising a driving gear, a driven gear, a planet gear interconnecting said gears, a rotatable member supporting the planet gear, a disc engaging the peripheries of the rotatable member and the driven gear, an annular member supporting said disc, and resilient means for engaging the disc with said peripheries.

10. A variable speed device comprising a driving gear, a driven gear, a planet gear interconnecting said gears, a rotatable member supporting the planet gear, a plurality of pairs of discs engaging the peripheries of the rotatable member and the driven gear, said pairs of discs being in diametrically opposed positions, and resilient means for engaging the discs with said peripheries.

11. A variable speed device comprising a pair of shafts in axial alignment, an orbit gear carried by one of said shafts, a bearing carried by said shaft, the end of the other shaft being journalled in said bearing, a rotatable member revolubly mounted on said second shaft, a plurality of planet gears carried by said rotatable member, and a disc engaging the peripheries of the orbit gear and rotatable member to determine their relative speeds.

12. A variable speed device comprising a sun gear mounted on a shaft, an orbit gear mounted on a shaft, a planet gear interconnecting the sun and orbit gears, a rotatable member revolubly mounted on the sun gear shaft for supporting the planet gear, and means frictionally engaging the orbit gear and rotatable member to determine their relative speeds.

In witness whereof, I hereunto subscribe my name this 8th day of March, 1930.

CLIFFORD E. IVES.